United States Patent [19]

Gross et al.

[11] 4,439,757

[45] Mar. 27, 1984

[54] INTERCHANGEABLE KEYBOARD DEFINING MEANS

[75] Inventors: Raymond J. Gross, Culver City; Fredrick W. Hogg, Los Angeles, both of Calif.

[73] Assignee: Mattel, Inc., Hawthorne, Calif.

[21] Appl. No.: 319,001

[22] Filed: Nov. 6, 1981

[51] Int. Cl.³ .............................................. G06F 3/02
[52] U.S. Cl. ......................... 340/365 VL; 340/365 R; 40/611
[58] Field of Search ........ 340/365 VL, 365 R, 365 S, 340/711, 712; 179/90 K; 178/17 C; 40/489, 490; 273/85 G; 200/309; 40/10 R, 10 B, 611, 616, 618

[56] References Cited

U.S. PATENT DOCUMENTS

| | | | |
|---|---|---|---|
| 4,035,940 | 7/1977 | Mickey et al. | 40/611 |
| 4,092,527 | 5/1978 | Luecke | 340/365 VL |
| 4,326,193 | 4/1982 | Markley et al. | 340/365 VL |
| 4,336,530 | 6/1982 | Koike et al. | 340/365 VL |

OTHER PUBLICATIONS

IBM Technical Disclosure Bulletin, Reisner, vol. 21, No. 8, Jan. 1979, pp. 3329-3330.

*Primary Examiner*—Gerald L. Brigance
*Attorney, Agent, or Firm*—Roy A. Ekstrand; Ron M. Goldman; James G. O'Neill

[57] ABSTRACT

A computer interactive device supports a planar keyboard and a display panel. A resilient keyboard overlay may be inserted to and removed from a position overlying the keyboard. The keyboard is surrounded by an inwardly projecting lip defining a pair of opposed openings near the keyboard center which facilitate overly interchange.

8 Claims, 9 Drawing Figures

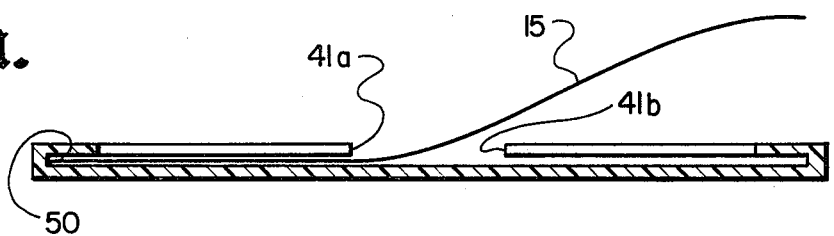
Fig.4.a.
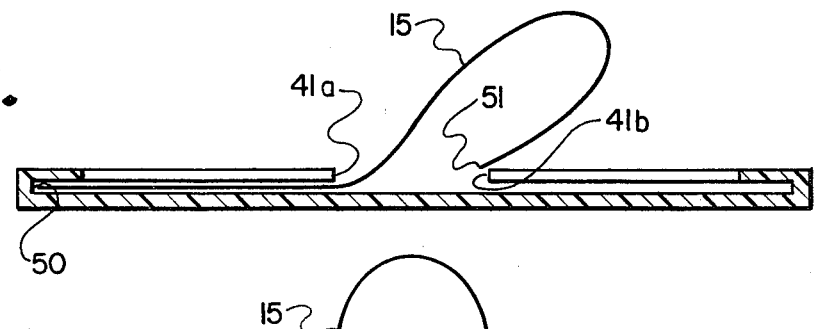
Fig.4.b.
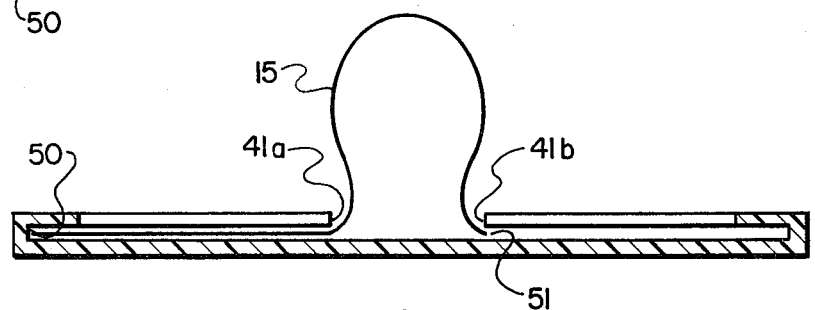
Fig.4.c.
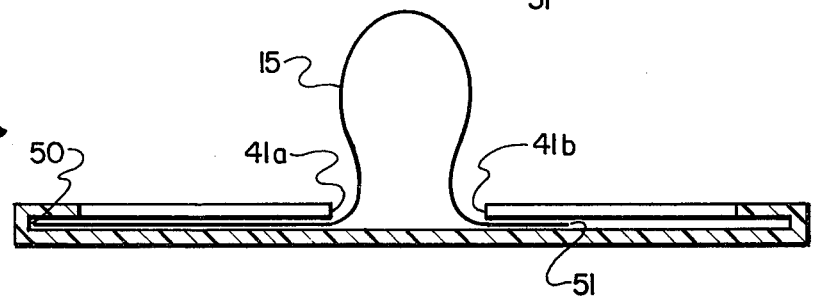
Fig.4.d.
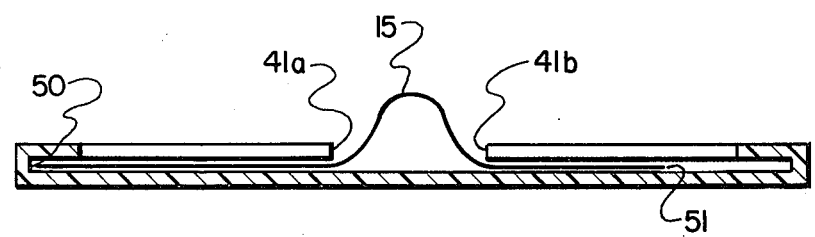
Fig.4.e.
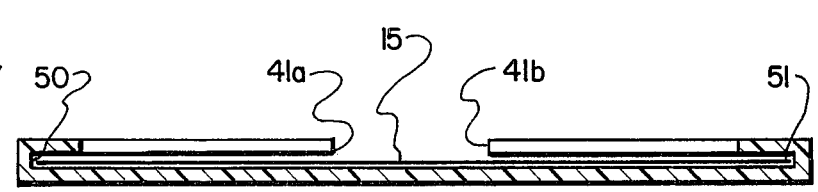
Fig.4.f.

INTERCHANGEABLE KEYBOARD DEFINING MEANS

BACKGROUND OF THE INVENTION

This invention relates to electronic keyboard devices for which a keyboard defining overlay is utilized.

In recent years, a number of electronic devices have been created in which a plurality of pushbutton controls are arrayed on a common plane. Perhaps one of the most common uses of such devices is that in which a keyboard accompanies a computer interactive device or terminal. While the present invention is applicable to any system in which a group of depressible switches are arrayed in a flush mounting arrangement upon a common plane, it is of particular advantage in applications using the recently developed resilient keyboard systems.

Such resilient keyboard systems vary somewhat in specific construction but may be generally described as a sandwhich of three insulative resilient sheets. The outer two sheets have conductive patterns deposited on the inwardly facing surfaces while the third "middle" sheet is free of conductive patterns but instead defines a plurality of apertures. The apertures in the middle sheet are sized and positioned such that portions of the conductive patterns of the two outer sheets are spaced apart on opposite sides of the apertures. Externally applied pressure upon one of the outer sheets in the region of an aperture, for example when pressed by a human finger in a keyboard operation, deforms the sheets and causes the opposed conductive patterns to meet and make electrical contact. Because the structure is a very simple configuration and because the user exposed sheet of resilient material is a continuous sheet of material not mechanically interrupted by protruding switch buttons or keys, visual indicia of the key designations overlying the regions of the apertures show the locations of "keys".

In many applications of such keyboards however, it is desired that the system significance of some or all of the keys within the keyboard be differently defined under differing circumstances. For example, in one instance it may be desired to alphabetically code a keyboard. In another instance, numerical coding of the keyboard may be desired. In still another instance the same keyboard may be coded in a different language or even scientific symbols. This situation of multiple keyboard definition is encountered frequently in computer interactive systems in which a portion of the computer system is housed in a memory cartridge which is removable and therefore interchangeable with compatible cartridges. Often such systems include, in addition to interchangeable memory cartridges, accompanying resilient overlays having key definitions corresponding to the peculiar requirements of each cartridge.

When so used, it is desirable that, once inserted, the resilient overlay be retained in a relatively secure manner to avoid displacement or damage during keyboard operation. However, it is also desireable that the means of retention of the flexible overlay in such systems be conducive to easy removal and insertion. While a number of overlay retention schemes have been devised and have to various degrees been successful in meeting these criteria, there remains in the art the need for an interchangeable keyboard defining system which provides secure overlay positioning and retention as well as easy removal and insertion.

SUMMARY OF THE INVENTION

Accordingly, it is a general object of the present invention to provide an improved interchangeable keyboard defining means. It is a more particular object of the present invention to provide an improved interchangeable keyboard defining means having a retaining system in which secure overlay retention and ease of removal and insertion are facilitated.

An interchangeable keyboard defining means for use in a keyboard device in which a plurality of depressible switches are arrayed in a switch plane includes a retaining guide track and overlying lip substantially surrounding the switch plane and defining a pair of opposed openings therein and a resilient keyboard-defining overlay bearing a plurality of key defining indicia. The overlay is configured to be inserted into the retaining guide track via the openings therein.

BRIEF DESCRIPTION OF THE DRAWINGS

The features of the present invention which are believed to be novel are set forth with particularity in the appended claims. The invention together with further objects and advantages thereof may best be understood by reference to the following description taken in conjunction with the accompanying drawings in the several figures of which like reference numerals identify like elements and in which:

FIGS. 4A through 4F are a sequential depiction of a resilient overlay being inserted into a retaining system constructed in accordance with the present invention.

DESCRIPTION OF THE PREFERRED EMBODIMENT

Figure 1:
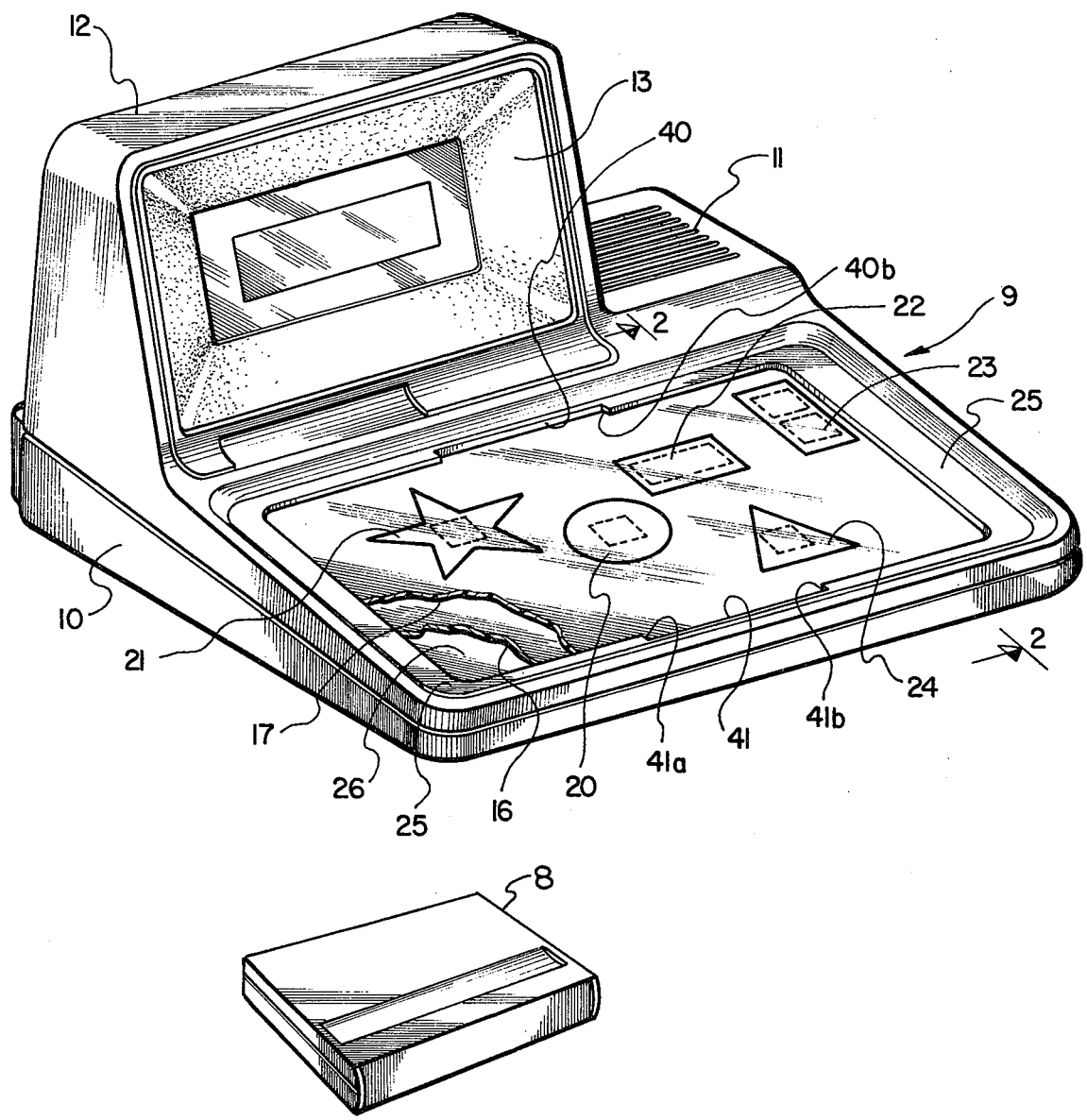
FIG. 1 is a partially sectioned perspective view of a computer interactive device constructed in accordance with the present invention.

FIG. 1 is a perspective view of a computer interactive device console constructed in accordance with the present invention. A computer interactive device 9 includes a molded plastic housing 10 which supports a speaker grill 11 and an upstanding portion 12. A viewing screen 13 is supported on the forward face of upstanding portion 12 in a manner that the display within device 9 (not shown) may be viewed by an operator positioned in a keyboard accessible location. Housing 10 defines a keyboard supporting surface 26 (visable in the lower left corner section) which extends beneath the entire keyboard. A keyboard 16 having the above-described three-layer construction referred to collectively by numeral 16 is supported upon surface 26 (shown more clearly in FIG. 2). Keyboard 16 includes a plurality of depressible keys 17, each of which is marked by a visible indicia 17. While the three-layer construction of keyboard 16 is shown in the present embodiment, it will be apparent to those skilled in the art that many keyboard constructions can be used which will facilitate practice of the present invention. A resilient overlay 15 shown partially sectioned and overlying keyboard 16 defines a plurality of visible keyboard defining indicia 20, 21, 22, 23, and 24. A keyboard overlay retaining lip 25 defined by housing 10 extends inwardly from the extremes of surface 26 and overlies peripheral portions of keyboard 16 and resilient overlay 15 in effect "framing" the overlay and keyboard. Lip portion 25 surrounds the entire border of overlay 15 with the exception of a pair of oppositely-positioned insertion openings 40 and 41. Lip 25 further defines a pair of guide or surfaces 40A, 40B, on each side of opening 40, and 41A and 41B at each side of opening 41. While lip 25 is in its preferred form continuous around the entire border of overlay 15 with the exception of openings 40 and 41, small interruption or gaps at other points may be tolerated for various reasons such as ease of molding without departing from the spirit and scope of the present invention.

Computer interactive device 9 also includes an aperture 14 through which an interchangeable memory cartridge 15 may be selectively removed or inserted. In accordance with well-known fabrication methods, cartridge 8 includes, in addition to a memory (not shown), means for making electrical connections (not shown). Correspondingly, device 9 includes within housing 10 means for receiving cartridge 8 and making electrical connections to the memory therein facilitating communication between the memory and circuitry within housing 10.

Figure 2:
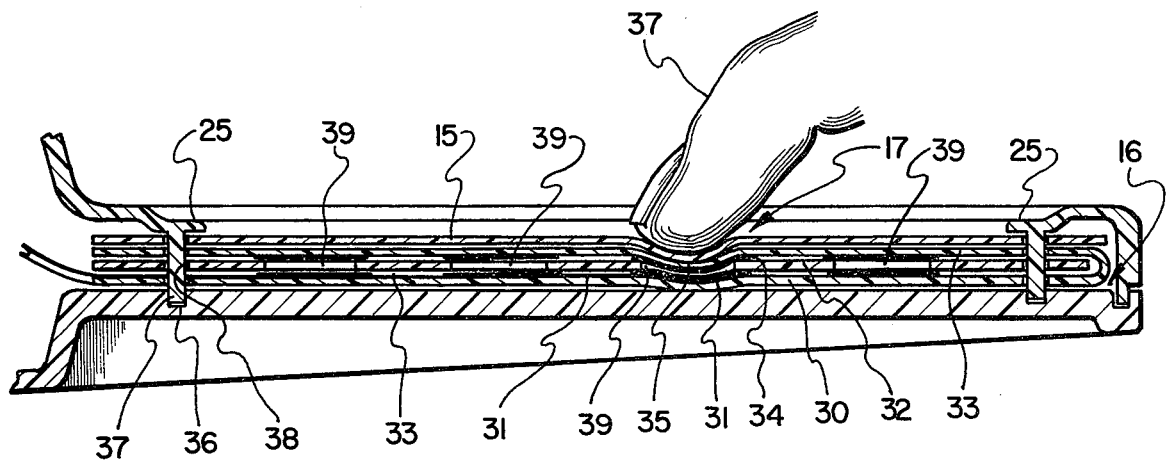
FIG. 2 is a section view of a portion of the computer interactive device of FIG. 1 taken along section lines 2—2.

FIG. 2 sets forth a section view showing construction details of the present invention interchangeable keyboard defining means. Surface 26 of housing 10 supports a multilayered resilient keyboard collectively identified by reference numberal 16. Keyboard 16 comprises a resilient sheet 30 upon the inwardly facing surface of which a conductive pattern 31 has been deposited, a resilient insulating sheet 32 defining a plurality of apertures including an aperture 39, a resilient sheet 35 having a conductive pattern 34 deposited on the inwardly facing surface thereof. Resilient overlay sheet 15 overlies the visible portion of keyboard 16. Lip 25 in its preferred form extends upwardly from surface 26 and overlies the edge portion of resilient sheet 15. As shown in FIG. 2, depression of resilient overlay 15 in the region overlying aperture 39 by finger 37 causes a corresponding dip or downward depression of resilient sheet 35 and conductive deposit 34. With sufficient pressure applied, conductive deposits 34 and 31, which are in the absence of such depression maintained in a spaced-apart non-contact relationship by sheet 32, are brought into contact thereby creating electrical connection between conductive paths appropriate to the particular one of the plurality of keyboard keys 17.

As can be seen by examination of FIG. 2 in particular, the motion of resilient sheet 15 is limited with respect to keyboard 16 in that lip 25 extends over sheet 15 in a manner which captivates sheet 15 and a plurality of projections 36 extend through apertures 38 in keyboard 16 and apertures 37 in surface 26. While some movement of sheet 15 is possible along surface 26, the extent of this movement is controlled by the clearances between the perimeter of sheet 15 and projections 36. This clearance between sheet 15 and lip 25 is established as a function of the resilience or flexibility of sheet 15 and is maintained between carefully selected limits. At one extreme the clearance between sheet 15 and lip 25 is large enough to permit ease of movement within the track formed by the underside of lip 25 and surface 26. At the other extreme, the clearance is maintained small enough to insure that lip 25 always overlays and captivates sheet 15.

Figure 3:
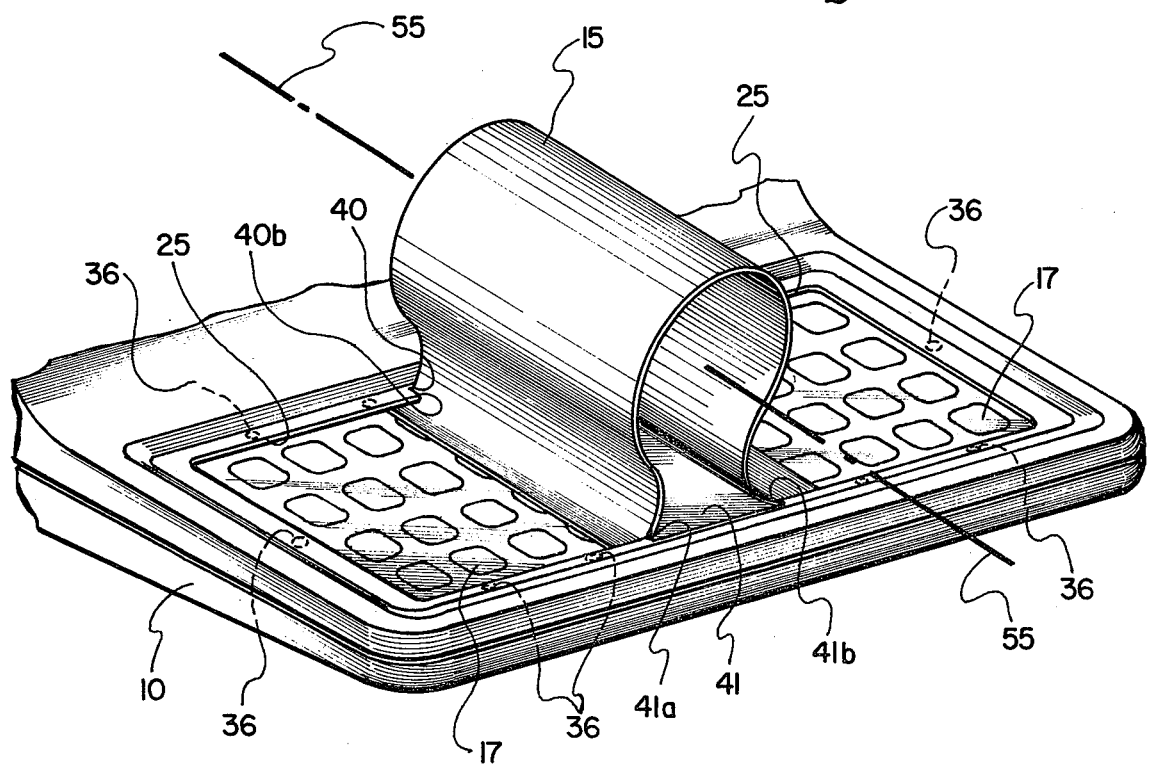
FIG. 3 is a pictorial view of a portion of the present invention system in which a resilient overlay is shown in a partially inserted position.

FIG. 3 shows a perspective view of the present invention interchangeable keyboard defining means as it appears at the approximate mid-point of either the withdrawal or insetion of resilient overlay 15 beneath lip 25. As is shown in both FIGS. 1 and 2, housing 10 defines an overlying lip 25 which extends over keyboard 16 about its entire periphery with the exception of insertion openings 40 and 41. As mentioned above and as is also shown in both FIGS. 1 and 3, opening 40 defines a pair of guiding surfaces 40A and 40B on each extreme. Similarly, opening 41 defines similar guiding surfaces 41A and 41B at its extremes. The size of openings 40 and 41 are selected in view of the flexibility of resilient overlay 15. The more flexible overlay 15, the smaller openings 40 and 41 can be and still permit insertion and withdrawl without creasing the overlay. Conversely the stifler the overlay, the larger the openings must be. As will be appreciated, it is preferred that overlay 15 not become folded, bent or otherwise deformed during insertion or removal. As shown in greater detail below, overlay 15 is inserted and/or removed from its retained position by flexing about an imaginary transverse axis 55 between openings 40 and 41 above and parallel to surface 26.

Also shown in FIG. 3 are a plurality of projections 36, each constructed as shown in FIG. 2. Projections 36 are spaced about the perimeter of sheet 15 (in the fully inserted position).

FIGS. 4A through 4F show the insertion of resilient overlay 15 into the present invention retaining means in a sequential manner. The figures depict the present invention overlay retaining means and flexible overlay in edge view. Beginning with FIG. 4A and progressing through FIG. 4F, the procedure of overlay insertion is depicted. In FIG. 4A resilient overlay 15 is shown having had a first end 50 inserted via aperture 41 and 40 past guide surfaces 41A and 40A and moved laterally (to the left in FIG. 4A) until end 50 thereof reaches its maximum leftward travel and abuts the interior surface of retaining rib 25. Thereafter as is shown in FIG. 4B, end 51 of resilient overlay 15 is loosely "folded", without creasing, urging end 51 toward camming surfaces 41B and 40B. Next, as shown in FIG. 4C, end 51 of overlay 15 is placed in alignment with camming surfaces 40B and 41B and positioned to allow end 51 of overlay 15 to pass through openings 40 and 41. Thereafter, as shown in FIG. 4D, overlay 15 is allowed to relax and its resilience urges end 51 of overlay 15 beneath rib 25 past camming surfaces 40B and 41B. After that, as shown in FIG. 4E, a gentle downward pressure on the loosley folded portion of overlay 15 causes continued travel of end 51 to the right resulting in the configuration shown in FIG. 4E. During this process camming surfaces 40B and 41B serve as bearings or guides to smooth out the curvature of overlay 15 and allow it to be insertion into the track without any deformation or creasing. Finally, with continued downward pressure on the folded portion of overlay 15, the slack material is guided via guide surfaces 40B and 41B until the entire overlay is relaxed and flatly positioned beneath lip 25 overlying the keyboard surface.

As will be apparent to those skilled in the art, the removal of resilient overlay 15 may be accomplished by simply reversing the sequence set forth in FIGS. 4A through 4F. That is, with gentle pressure on both sides of aperture 40 and 41 upon overlay 15 as shown in FIG.

4F urging ends 50 and 51 laterally toward center, overlay 15 will be caused to bulge at the center in the regions of openings 40 and 41 as shown in FIG. 4E. It should be noted that under such urging, overlay 15 may be withdrawn from beneath rib 25 either symmetrically as shown in FIG. 3 or unsymmetrically as shown in FIG. 4D. Thereafter, continued lateral urging of overlay 15 toward the center will increase the bulge formed and the withdrawal of ends 50 and 51 of overlay 15 toward openings 40 and 41. As this process is continued, a point is reached similar to that shown in 4C in which one end of overlay 15 has cleared the camming surfaces (either 40B and 41B, or 40A and 41A) and the overlay is withdrawn in the sequence shown in FIG. 4B. Thereafter, the bend or loose fold of overlay 15 shown in FIG. 4B is relaxed arriving at the configuration shown in FIG. 4A. The withdrawal is completed by lateral motion of overlay 15 withdrawing the remaining end of overlay 15 from the track.

With overlays of larger sizes and greater aspect ratios, the withdrawal may be as simple as pulling toward the center from both sides to reach the configuration shown in FIG. 3 and while holding onto the overlay maintaining the fold withdrawing both ends from beneath rib 25 simultaneously. Regardless of which technique is used, it will be apparent that the insertion and withdrawal of flexible overlay 15 is accomplished readily and the overlay is retained without the need of any moveable parts, clamps, or additional hardware.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. Interchangeable keyboard defining means comprising:
    a housing formed of an insulative material and defining a keyboard support;
    a keyboard including a plurality of switches each including a depressible key, said keys being arrayed in a common keyboard plane;
    means retaining said keyboard in said keyboard support;
    a retaining lip, supported by said housing, substantially surrounding said keyboard plane and overlying the periphery of said keyboard plane and extending and inwardly along said periphery for a predetermined distance defining a pair of openings formed by reduced inward extensions of said lip, said openings being oppositely positioned with respect to said keyboard plane on a common transverse axis;
    an overlay formed of a flexible sheet of resilient material having a perimeter larger than said lip having a smaller dimension than the distance along said transverse axis between the extremes of said openings, including a plurality of visual key definition indicia and having first and second opposed edges;
    said overlay capable of being inserted into and removed from a position overlying said keyboard by loose folding thereof along said transverse axis and insertion or removal of said first and second opposed edges of said overlay through said openings;
    said retaining lip and said keyboard plane cooperating to retain said overlay in a fixed position with respect to said keyboard in all directions and in substantially flat relationship therewith.

2. Interchangeable keyboard defining means as set forth in claim 1 wherein said retaining lip defines guide surfaces adjacent said openings which provide bearing surfaces for said overlay during insertion and withdrawal.

3. Interchangeable keyboard defining means as set forth in claim 2 wherein said keyboard plane and said overlay are substantially rectangular defining a pair of longer sides and a pair of shorter sides and wherein said pair of openings are located on said longer sides.

4. Interchangeable keyboard defining means as set forth in claim 3 wherein said pair of openings are symmetrically located within the center third of said longer sides.

5. Interchangeable keyboard defining means as set forth in claim 4 wherein said retaining lip is continuous about the periphery of said keyboard plane between said guide surfaces.

6. Interchangeable keyboard defining means as set forth in claim 5 wherein said overlay has a substantially uniform thickness and wherein said retaining lip is spaced above said keyboard plane a distance in excess of twice said overlay thickness.

7. Interchangeable keyboard defining means as set forth in claim 6 wherein said keyboard comprises first and second overlying resilient sheets having first and second conductive patterns deposited respectively thereon and a third resilient sheet interposed between said first and second sheets defining a plurality of apertures through which overlying portion of said first and second conductive patterns may be pressed into contact and wherein said first resilient sheet bears a smooth surface permitting said overlay to slide easily thereacross during insertion and removal.

8. For use in a computer interactive system having a processor unit including a stored program and a terminal having a plurality of user-operable keys in which said processor unit is accessed by said keys and in which the response of said processor unit to actuation of said keys is at least partially defined by said stored program and in which indicia of key definition are visually communicated, interchangeable keyboard defining means comprising:
    a laminar keyboard having a first substantially uniform predetermined thickness and including first and second overlying resilient sheets having respective first and second inwardly facing surfaces and respective first and second outwardly facing surfaces, first and second conductive patterns deposited upon said first and second inwardly facing surfaces respectively, and a third resilient sheet interposed between said first and second sheets defining a substantially rectangular array of apertures through which overlying portions of said first and second conductive patterns may be brought into contact, said first and second deposited conductive patterns and said apertures cooperating to form a plurality of keys;
    an insulative housing defining a substantially planar keyboard support surface, means retaining said laminar keyboard upon said keyboard support surface an overlay retaining track substantially surrounding said keyboard support surface and including an interior grove extending outwardly from the perimeter of said surface and an overlying lip portion extending inwardly from the perimeter of said surface and spaced above said keyboard support surface by a first predetermined substantially uniform distance, and means positively locating and retaining said laminar keyboard upon said surface;

said overlying lip portion defining a pair of openings formed by reduced inward extensions of said overlying lip portion oppositely positioned with respect to said keyboard support surface on a common transverse axis; and a removeable overlay formed of a substantially rectangular resilient sheet having a second substantially uniform thickness, first and second smooth surfaces having a length and width greater than the corresponding distances between opposed portions of said overlying lip portion and a width less than the distance between said reduced inward extensions of said overlying lip portion and a plurality of key defining indicia visible upon said first surface and positioned to overlay selected ones of said keys when said overlay is placed overlying said keyboard;

said first substantially uniform thickness of said laminar keyboard and said second substantially uniform thickness of said removeable overlay combined being less than one half said first predetermined substantially uniform distance;

said overlying lip portion and said keyboard support surface cooperating to retain said removeable overlay in a fixed position with respect to said keyboard support surface in all directions and in substantially flat relationship therewith.

* * * * *